D. G. ROWELL.
FOUNDER'S LADLE.
APPLICATION FILED SEPT. 4, 1917.
1,301,172.
Patented Apr. 22, 1919.
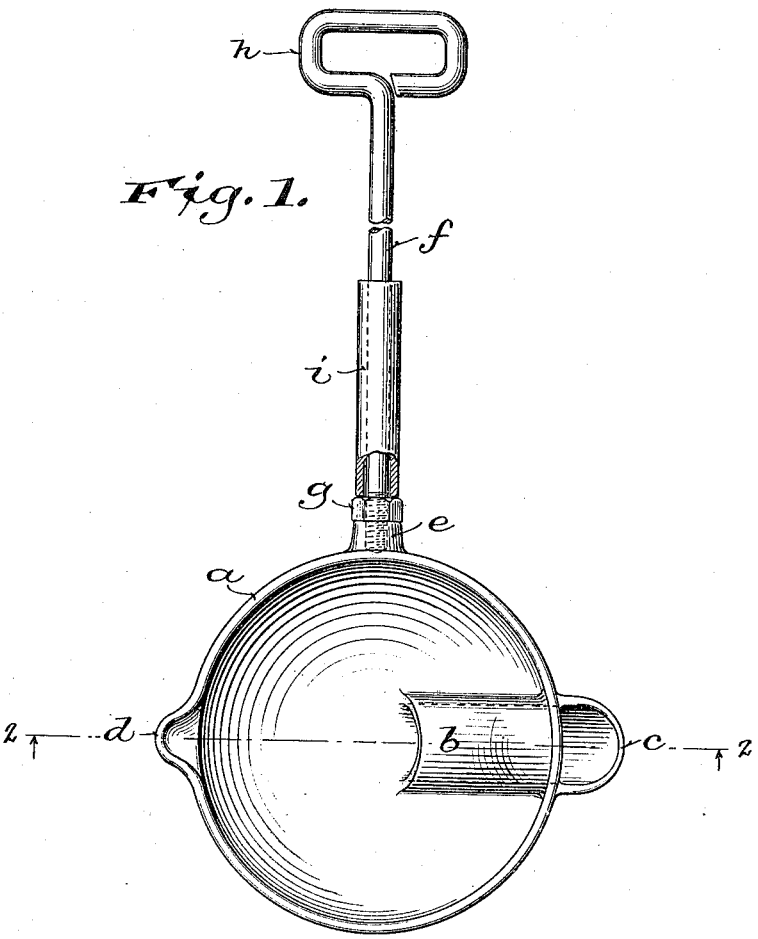
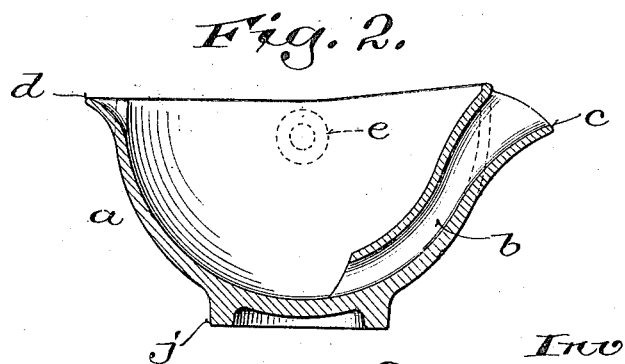

UNITED STATES PATENT OFFICE.

DUDLEY G. ROWELL, OF APPLETON, WISCONSIN.

FOUNDER'S LADLE.

1,301,172.
Specification of Letters Patent.
Patented Apr. 22, 1919.

Application filed September 4, 1917. Serial No. 189,679.

*To all whom it may concern:*

Be it known that I, DUDLEY G. ROWELL, a citizen of the United States, residing at Appleton, in the county of Outagamie and State of Wisconsin, have invented certain new and useful Improvements in Founders' Ladles, of which the following is a specification, reference being had to the accompanying drawing, forming a part thereof.

This invention relates more particularly to ladles for melting and pouring metals, especially Babbitt metal and other alloys.

Its main objects are, in filling boxes, molds or the like, to take the molten metal from below the surface, where it is free from scoria, dross or impurities, and thus avoid the objections to common methods of manual skimming and the oxidation and cooling of the metal incident to the removal of the protecting scum or coating of such scoria, dross or impurities which forms on the surface of the molten metal in the ladle; to provide for surface as well as subsurface pouring from the same ladle and thus increase the adaptability of the ladle to various uses; and generally to facilitate pouring molten metal from the ladle and improve the construction and operation of ladles of this class.

The invention consists in the construction, arrangement and combination of parts as hereinafter particularly described and pointed out in the claims.

In the accompanying drawing like characters designate the same parts in both figures.

Figure 1 is a plan view of a ladle embodying the invention; and Fig. 2 is a vertical cross section thereof on the line 2—2, Fig. 1.

The ladle comprises a bowl $a$, which may be made of cast iron and of substantially semispherical form. The bowl is formed on one side with a closed internal subsurface pouring conduit or channel $b$, extending from the lower part of the interior of the bowl into which it opens at its lower end, to the upper part thereof, and terminating at its upper end below the rim of the bowl in an outwardly projecting spout $c$.

On the opposite side from the spout $c$ the bowl is formed with an outwardly projecting surface-pouring lid $d$.

Midway between the spout $c$ and lip $d$ the bowl is formed on one side with an internally threaded boss $e$, and is provided with a detachable cylindrical metal arm $f$, threaded in said boss and rigidly secured in place therein by a lock nut $g$.

At its outer end the handle arm is bent into a loop $h$, projecting on opposite sides of the arm transversely thereto and forming a convenient grip or handle for tipping the bowl of the ladle sidewise in either direction, and to assist in lifting and carrying it. The arm $f$ is provided with a tubular grip or handle $i$, loosely mounted and rotatable thereon and shiftable lengthwise thereof. This tubular grip or handle may be made of a section of metal pipe such as iron or steel gas pipe, and is of considerably less length than the handle arm, so that it can be shifted outwardly against the handle $h$, where it will not become heated when the contents of the ladle is being melted.

For lifting and carrying the ladle and pouring its contents, the tubular handle is shifted inwardly against the nut $g$ next to the bowl, as shown in Fig. 1, and affords a convenient grip for supporting and carrying the ladle with one hand close to the bowl, while the handle $h$ is grasped and held with the other hand at a distance from the bowl.

In pouring from either the spout $c$ or the lip $d$, the handle $h$ is turned with one hand, while the tubular handle or sleeve $i$ in which the arm or rod $f$ turns freely, is firmly grasped and held with the other hand.

The bottom of the bowl is formed with a depending base flange or rim $j$, on which the ladle will firmly stand without tipping when it is not in use and contains molten metal.

Boxes, molds or the like, are expeditiously filled by pouring from below the surface of the molten contents of the ladle through the channel $b$ and spout $c$, thus avoiding the necessity and trouble of skimming or removing the scum or coating of scoria, dross or impurities which rapidly forms on the surface of the metal, the molten metal taken from the bottom or lower part of the bowl into which the channel $b$ opens at its lower end, being free or comparatively free from such scoria, dross or impurities, and the scum or coating on the surface tending to prevent the oxidation and cooling of the metal below it.

For filling small boxes, molds or the like, or pouring a small quantity of metal when accurate regulation and control of its flow is necessary or desirable, the ladle is tipped in the opposite direction and the molten metal is poured from the surface in full and clear view of the operator, from the lip $d$.

I claim:

1. A founder's ladle comprising a bowl formed integrally with a closed subsurface-pouring conduit extending from a point adjacent to the bottom and interior of the bowl to the upper part thereof and terminating below its rim in an outwardly projecting pouring spout and a surface-pouring lip projecting outwardly from the opposite side of the bowl, and a handle arm rigidly attached at one end to one side of the bowl midway between said spout and lip and provided at its other end with a transverse handle for carrying and tilting the bowl.

2. A founder's ladle comprising a bowl formed integrally with a closed subsurface-pouring conduit leading from the lower part of the interior of the bowl upwardly to one side thereof and terminating below its rim with an outwardly projecting spout and a surface-pouring lip projecting outwardly from the opposite side of the bowl, a cylindrical handle arm rigidly attached at one end to one side of the bowl midway between said spout and lip and provided at the other end with a transverse handle for tipping the bowl sidewise, and a tubular hand grip rotatably mounted on said arm and shiftable lengthwise thereof.

3. A founder's ladle comprising a bowl formed integrally with a closed subsurface-pouring conduit extending from the lower to the upper part thereof and terminating at its upper end below the rim of the bowl in an outwardly projecting spout, an outwardly projecting surface-pouring lip on the opposite side, and a depending base flange on the bottom; and a handle arm attached to the bowl on one side midway between said spout and lip.

In witness whereof I hereto affix my signature.

DUDLEY G. ROWELL.

Copies of this patent may be obtained for five cents each, by addressing the "Commissioner of Patents, Washington, D. C."